United States Patent Office 2,759,009
Patented Aug. 14, 1956

2,759,009

METHOD OF CONVERTING METHYL TRICHLOROSILANE TO DIMETHYL DICHLOROSILANE

Eugene O. Brimm, Kenmore, N. Y., assignor to Union Carbide and Carbon Corporation, a corporation of New York No Drawing. Application September 15, 1954, Serial No. 456,335

5 Claims. (Cl. 260—448.2)

Methyl trichlorosilane is produced as a by-product of many of the processes by which dimethyl dichlorosilane is made and to such an extent that more than marketable quantities of the trifunctional methyl trichlorosilane are obtained. Because of this it is desirable to have a method for converting the methyl trichlorosilane obtained as a byproduct to the product primarily desired, namely, dimethyl dichlorosilane. This invention relates to a method for converting methyl trichlorosilane to dimethyl dichlorosilane.

In the method of this invention methyl trichlorosilane is converted to dimethyl dichlorosilane by reacting methyl trichlorosilane with the solid hydrolysis product of methyl trichlorosilane at an elevated temperature in an oxygen-free atmosphere; the oxygen-free atmosphere may be an inert gas or consist of vaporized methyl trichlorosilane free of oxygen. The reaction appears to take the following course, $$2CH_3SiCl_3 + 4CH_3SiO_{3/2} \rightarrow 3(CH_3)_2SiCl_2 + 3SiO_2$$

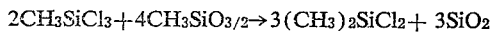

The solid hydrolysis product of methyl trichlorosilane is methyl polysiloxane, $(CH_3SiO_{3/2})_x$. Methyl polysiloxane may be conveniently prepared from methyl trichlorosilane by slowly pouring the silane over cracked ice while vigorously stirring the mixture, and then heating and digesting the resultant mixture for several hours to complete the hydrolysis and remove the hydrochloric acid formed in the hydrolysis reaction. The resulting methyl polysiloxane may be recovered by filtering, and then washed and dried.

A suitable apparatus for the reaction between methyl polysiloxane and methyl trichlorosilane is a vessel made of a material which will not interfere with the reaction such as silica, and provided with a source of heat. A convenient arrangement is a silica tube and an external source of heat such as an electric furnace.

In a typical run the vessel is packed with the dried methyl polysiloxane; oxygen is removed and the vessel is then brought to reaction temperature (a temperature above 450° C.). After this, the methyl trichlorosilane is passed through the packed tube. The silane may be carried on a stream of an inert oxygen-free gas or may be introduced into the reaction vessel as an oxygen-free vapor. The rate of entry of the silane should be such that the reaction temperature is maintained and the methyl trichlorosilane is adequately contacted with the methyl polysiloxane. Using a 1.5 inches I. D. "Vycor" tube packed to a bed depth of 20 inches with methyl polysiloxane and maintained at a temperature of 600° C., a flow of 0.5 to 1 cubic foot per hour of a carrier gas bubbled through liquid methyl trichlorosilane has proved satisfactory.

If a carrier gas is employed the methyl trichlorosilane may conveniently be carried on a stream of argon or other non-oxidizing gas by passing the gas through a vessel, such as a bubbler, filled with methyl trichlorosilane, and thence into the reaction vessel.

The unreacted methyl trichlorosilane and the dimethyl dichlorosilane product may be passed from the reaction vessel into a cold trap and thus collected. A trap cooled with Dry Ice is satisfactory.

Following the general procedure indicated above, employing a methyl polysiloxane bed depth of 5 inches in a 1 inch inside diameter "Vycor" tube at a temperature of 500° C. and a gas flow rate of 1 cubic foot per hour the product contained about 6 per cent dimethyl dichlorosilane. Under conditions otherwise the same except for the temperature being maintained at 600° C., the product contained about 29 per cent dimethyl dichlorosilane. In each case the methyl trichlorosilane employed as a reactant contained about 3 per cent dimethyl dichlorosilane.

Employing a 1.5 inches I. D. "Vycor" tube, a bed depth of 20 inches, and a flow rate of 0.5 cubic foot per hour the conversion of methyl trichlorosilane to dimethyl dichlorosilane was about 11 per cent.

The following examples are illustrative:

In these examples solid methyl polysiloxane obtained by hydrolysis and condensation of methyl trichlorosilane was placed in a "Vycor" tube of the noted diameter and depth of bed and heated in a non-oxidizing atmosphere to the indicated temperature. The designated carrier gas was bubbled through methyl trichlorosilane at the rates shown and then passed through the packed tube. The product was collected in a trap maintained at Dry Ice temperature and then analyzed. The results are tabulated in Table 1, below.

TABLE 1

| Example | I | II | III | IV | V |
|---|---|---|---|---|---|
| Tube: | | | | | |
| Inside diameter (inches) | 1 | 1 | 1 | 1.5 | 1.5 |
| Depth of polymer bed (inches) | 5 | 5 | 5 | 20 | 20 |
| Carrier gas and flow rate (c. f. h.) | A 1 | A 1 | A 1 | A 1 | A 0.5 |
| Running time (hrs.) | 1 | 1.5 | 2.3 | 7.5 | 7 |
| $CH_3SiCl_3$ passed in (grams) | (¹) | (¹) | (¹) | ¹ 211 | ² 103.9 |
| Grams of product | 24.6 | 15 | 22.6 | 159 | 99.2 |
| $(CH_3)_2SiCl_2$ in product (mole per cent) | (³) | 5.9 | 29.1 | 6.8 | ⁴ 21.4 |

¹ Contained 3.2 percent $(CH_3)_2SiCl_2$.
² Contained 6.8 percent $(CH_3)_2SiCl_2$.
³ Very little.
⁴ The net yield represents a conversion of charged $CH_3SiCl_3$ to $(CH_3)_2SiCl_2$ of 11.3 percent based on the previously proposed reaction equation.

In Examples I, II, and III the amount of methyl trichlorosilane vaporized into the system was not determined inasmuch as the experiments were on a small scale and, in order to minimize errors introduced by hydrolysis and through handling losses, the apparatus was kept closed during the experiments.

Infrared analysis was employed to determine the mole per cent of dimethyl dichlorosilane in the product.

Analysis of the methyl polysiloxane before and after reaction with methyl trichlorosilane shows that the reaction results in a decrease in the percentage of methyl groups in the polysiloxane showing that the methyl trichlorosilane reacted with the polysiloxane. This is shown by the following, Table 2. Analysis was for carbon, hydrogen, and silicon. Per cent oxygen was obtained by difference.

TABLE 2

| Element | Theoretical Percentage | Percentage before reaction | Percentage after reaction |
|---|---|---|---|
| C | 17.9 | 18.5 | 12.4 |
| H | 4.5 | 4.7 | 2.6 |
| S | 41.8 | 38.9 | 40.9 |
| O | 35.8 | 37.9 | 44.1 |

What is claimed is:

1. The method for making dimethyl dichlorosilane which comprises contacting methyl trichlorosilane under oxygen-free conditions with a solid monomethyl polysiloxane polymer at an elevated temperature at which reaction occurs.

2. The method for making dimethyl dichlorosilane which comprises contacting methyl trichlorosilane in the vapor phase under oxygen-free conditions with a solid monomethyl polysiloxane polymer at a temperature above 450° C., and in a non-oxidizing atmosphere.

3. The method for making dimethyl dichlorosilane which comprises contacting a mixture of an inert oxygen-free gas and methyl trichlorosilane with a solid monomethyl polysiloxane polymer at a temperature above 450° C.

4. The method for making dimethyl dichlorosilane which comprises contacting a mixture of an inert oxygen-free gas and methyl trichlorosilane with a solid monomethyl polysiloxane polymer at a temperature between 450° C. and 700° C.

5. The method for making dimethyl dichlorosilane which comprises contacting methyl trichlorosilane in the vapor phase under oxygen-free conditions with a solid monomethyl polysiloxane polymer at a temperature between 450° C. and 700° C.

References Cited in the file of this patent

Rochow: "Chemistry of the Silicones," 2nd ed. (1952), pages 78–82, Wiley & Sons, publishers, N. Y.